(12) United States Patent
Sanders

(10) Patent No.: US 8,261,593 B1
(45) Date of Patent: Sep. 11, 2012

(54) LEAK DETECTOR FOR HEAT EXCHANGER

(76) Inventor: Leon Sanders, Auburn, WA (US)

(*) Notice: Subject to any disclaimer, the term of this patent is extended or adjusted under 35 U.S.C. 154(b) by 516 days.

(21) Appl. No.: 12/572,740

(22) Filed: Oct. 2, 2009

(51) Int. Cl.
*G01M 3/02* (2006.01)

(52) U.S. Cl. .................................... 73/40.5 R

(58) Field of Classification Search ............ 73/323
See application file for complete search history.

(56) References Cited

U.S. PATENT DOCUMENTS

| | | | |
|---|---|---|---|
| 4,103,536 A * | 8/1978 | Chipman | 73/40 |
| 4,467,635 A * | 8/1984 | Dahmen et al. | 73/40.5 R |
| 4,783,988 A | 11/1988 | Bao et al. | |
| 4,942,920 A * | 7/1990 | Chalifoux et al. | 165/11.1 |
| 5,974,863 A * | 11/1999 | Persson | 73/40.5 R |
| 6,009,745 A * | 1/2000 | Shaw et al. | 73/40.7 |
| 6,035,700 A * | 3/2000 | Shaw | 73/40.7 |
| 6,314,794 B1 | 11/2001 | Seigeot | |
| 6,923,043 B2 * | 8/2005 | Rabelle | 73/40.5 R |
| 7,454,956 B1 | 11/2008 | LoPresti | |
| 7,975,529 B2 * | 7/2011 | Gustafsson et al. | 73/40.5 R |

FOREIGN PATENT DOCUMENTS

GB 2411480 A * 8/2005 .................. 73/40

* cited by examiner

*Primary Examiner* — Daniel Larkin
(74) *Attorney, Agent, or Firm* — Joseph Z. Ellsworth

(57) ABSTRACT

A heat exchanger leak detector employs a bubble detector to detect gas pressure build up in a heat exchanger second side from leakage of pressurized gas introduced in a heat exchanger first side.

3 Claims, 2 Drawing Sheets

LEAK DETECTOR FOR HEAT EXCHANGER

BACKGROUND

1. Field of the Invention

This invention relates to detection of leaks in heat exchangers, and more specifically to visible detection of a leak from one heat exchanger side to the other heat exchanger side using gas pressure build-up to create bubbles in a liquid outside the heat exchanger.

2. Prior Art

Heat exchangers comprise a first side, sometimes referred to as a product side, and a second side, sometimes referred to as a media side, in close contact with the first side. Plate heat exchangers that comprise a number of plates closely packed in series with fluids flowing through them while maintaining the two sides separate. Plate heat exchangers are commonly used in food processing where it is imperative that the fluids from the two sides remain separate, that is, that there are no leaks between the two heat exchanger sides that could cause cross contamination. Cross contamination occurs when a crack or pinhole develops, allowing fluids on one side to pass from one side into the other side and mix with fluids on that side usually assisted by a pressure difference that exists between the two sides. Because contamination can have serious consequences, it is routine to check the plates for any defect that may result in a leak.

Checking for defects usually involves removing a plate and testing it apart from the heat exchanger. Disassembly of the heat exchanger is time consuming and interrupts its use. The need remains for a device and method that can perform a quick and easy test on a heat exchanger in place without removal and disassembly of the heat exchanger to minimize interruption of use of the heat exchanger.

SUMMARY OF THE INVENTION

This object is achieved in a heat exchanger leak detector that employs a bubble detector to detect gas pressure build up in a heat exchanger's second side from leakage of pressurized gas introduced in a heat exchanger's first side.

The detector employs a U-shaped container for receiving a liquid, such as water, a modified plug adapted to connect to an exchanger port, and a tube running between them providing fluid communication between the modified plug and the container.

When there is a leak in the heat exchanger, air pressure from the heat exchanger first side passes through the leak into the heat exchanger's second side, which pressure passes through the tube into water in the U-shaped container. When gas pressure builds up over the head in the tube portion that is below water level is discharged from the tube's second end and into the water forming bubbles of the gas to rise in the water from the tube's second end, providing a visual indicator of gas build up.

The top of the container is typically closed. Therefore gas released from the bubbles causes a pressure build-up in the container above the water. When pressure builds up above the water, a water level difference between the two container legs follows, creating a further visible indicator of the leak The device is adapted for use outside the exchanger system as a simple and temporary leak detector. Thus, it may be used with any heat exchanger design by simply connecting the detector to a port on one side of the heat exchanger, supplying air pressure to a port on the other side and sealing all remaining ports. It is then easily removed for normal operation of the heat exchanger. Because air can be used to pressurize the first side of the heat exchanger and water can be used in the container, the detector is inexpensive to use and quick to install.

DETAILED DESCRIPTION OF THE PREFERRED EMBODIMENT

Figure 1:
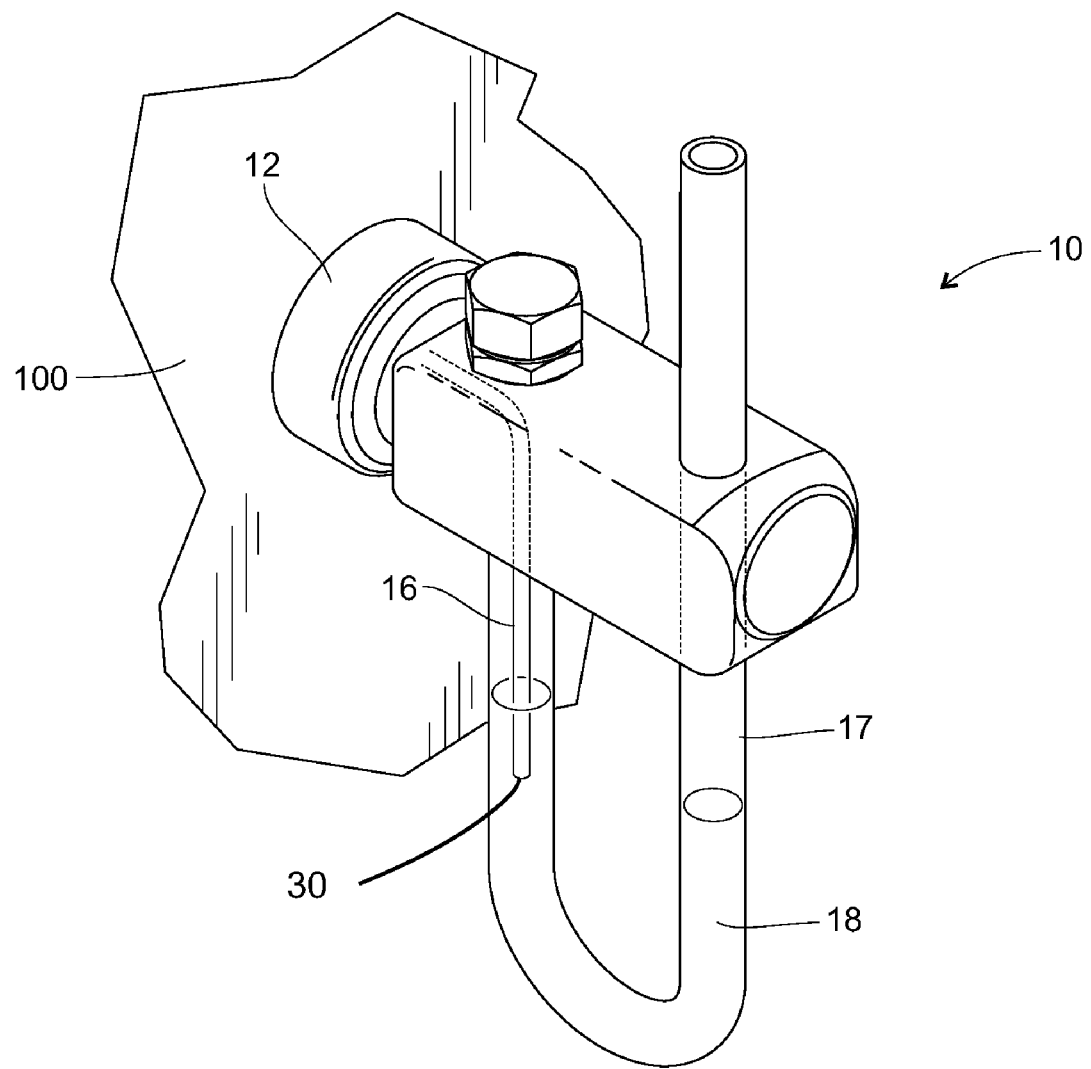
FIG. 1 is a perspective view of the heat exchanger leak detector of the present invention.
Figure 2:
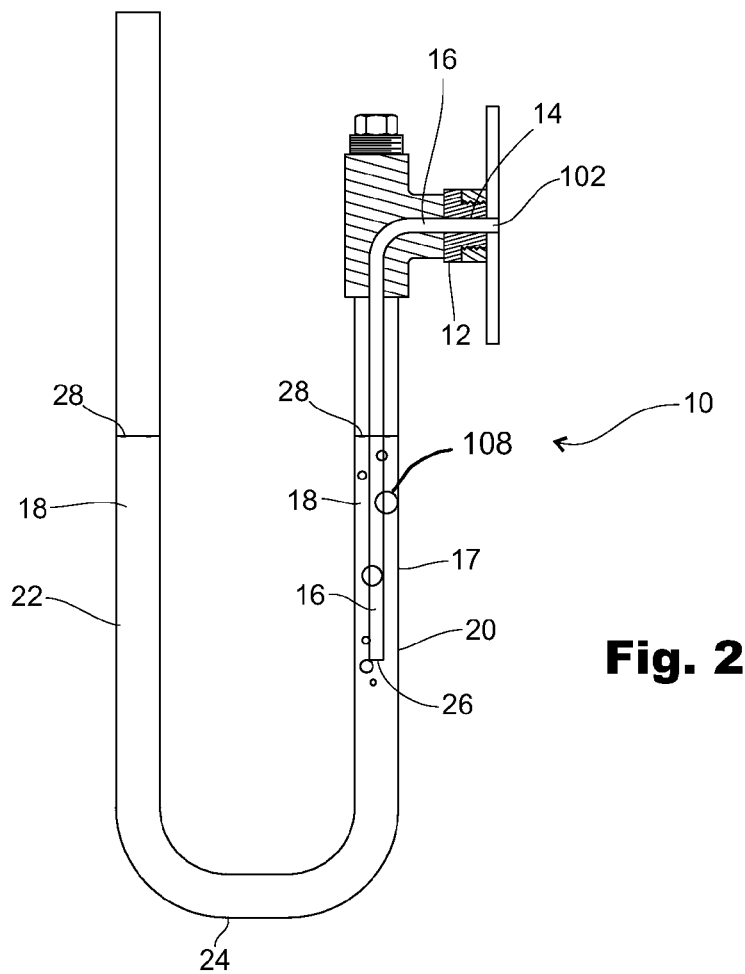
FIG. 2 is a side view of the heat exchanger leak detector of FIG. 1, shown connected to a heat exchanger port and with bubbles visible in water in the first leg of the U-shaped container.
Figure 3:
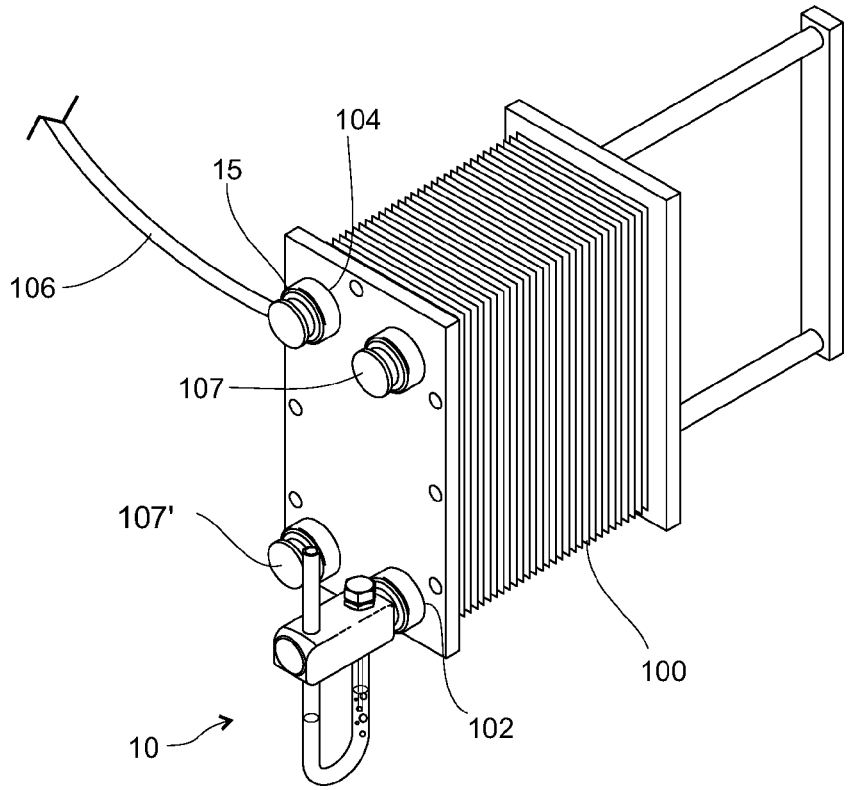
FIG. 3 is a perspective view of the heat exchanger leak detector of FIG. 1 shown connected to a port on one side of the heat exchanger and pressurized gas supplied to a port on the other side of the heat exchanger with other heat exchanger ports capped.

The gas leak detector 10 of the present invention for use with a heat exchanger 100 comprises a modified port plug 12 adapted to fit in a first heat exchanger port 102 that provides access to a heat exchanger's first side (not shown), with a hole 14 through the modified plug 12. A second port plug 15 connects to second heat exchanger port 104 to which a supply of pressurized air 106 is connected. The second heat exchanger port 104 provides access to a heat exchanger second side (not shown). A tube 16 extends from the hole 14 into a container 17 that can be filled with a liquid 18, typically water.

The container 17 is a generally U-shaped with first and second legs 20, 22 extending upward from a bottom 24. The first leg 20 connects to the modified plug 12 with an air tight seal. The tube 16 extends from the modified plug 12 into the first leg 20 of the U-shaped container 17 to a tube end position 26 below a position 28 to which water, or other equivalent liquid, is filled during use. The second leg 22 is typically open to the atmosphere to allow the water level to adjust without pressure in the second leg 22. It also may be closed to create a difference in water level in the two legs 20, 22 when the first leg 20 is pressurized by air from the heat exchanger's second side in the instance that pressurized air passes through a leak between the heat exchanger's first and second sides, in which case a fill port is provided in the container into which the liquid can be poured into and out of the container 16.

In operation, all pipes and hoses are removed from the heat exchanger to be tested. Other ports 107, 107' of from each of the first and second sides of the heat exchanger 100 are capped. The leak detector modified plug 12 is secured with an air tight seal in the first heat exchanger port 102 of the heat exchanger's second side. Air pressure is supplied to the second heat exchanger port 104 and the U-shaped container 17 is filled with water to a suitable level above the end 30 of the tube 16. At least the first leg 20 of the container 17 is clear for visible inspection of the water. After a period of time, if there is a leak bubbles 108 will appear in the water as air pressurizes the second side of the heat exchanger 100 through the leak which bubbles are visible through the container 17.

If the bubble test does not quickly disclose a leak, the detector is left for a longer period of time to allow gas to be released from bubbles over that longer time which accumulates and pressurizes the first leg 20 above the water level, which causes a difference in water level between the container's first and second legs 20, 22, which is a more sensitive indicator of a leak.

What is claimed is:

1. A method of testing a heat exchanger for leaks without disassembling the heat exchanger comprising the following steps:
   a) removing all pipes and hoses from the heat exchanger;
   b) capping a first port from each of first and second sides of the heat exchanger;
   c) securing a modified plug with an air tight seal to a second port of the heat exchanger's second side, the modified plug having a hole therethrough and further having a tube extending from the modified plug at the hole;
   d) placing an end of the tube in a container having water within with the end of the tube below a water level, therein providing fluid communication between the second side of the heat exchanger and the water such that air under pressure in the second side of the heat exchanger is discharged into the water;
   e) supplying pressurized air to a second port of the first side of the heat exchanger; and
   f) observing bubbles or lack thereof in the water as an indication of said pressurized air leaking from the first side to the second side of the heat exchanger.

2. The method of claim 1 further comprising the step of observing a difference in water level between container first and second legs as an indicator of a leak where the container is U-shaped having first and second legs extending vertically from a container bottom and the tube extends into one leg of the U-shaped container, which is closed with an effective air-tight seal above the water level in that leg.

3. A leak detector adapted to detect a leak in a heat exchanger without disassembly of the heat exchanger, comprising;
   a) a container that can be filled with a liquid to a liquid level;
   b) a modified port plug adapted to fit in a first heat exchanger port of a heat exchanger's first side, with a hole through the modified port plug;
   c) a tube extending from the hole into the container therein providing fluid communication between the first heat exchanger port and said liquid when the liquid is added to the container; and
   d) a pressurized gas supply line adapted to connect to a second heat exchanger port of a heat exchanger's second side therein providing pressurized gas to the second heat exchanger port such that when a leak exists in the heat exchanger between the heat exchanger's first and second sides, pressurized gas from the gas supply line passes into the heat exchanger's second side and is discharged through the tube into the container creating visible bubbles in the liquid therein indicating the leak,
   e) wherein the container is U-shaped having first and second legs extending vertically from a container bottom and wherein the tube extends into one leg of the U-shaped container, which leg is closed with an effective gas-tight seal above the liquid level such that gas in the bubbles is discharged into the closed container leg above the liquid causing a difference in liquid level between container first and second legs as a further indicator of the leak.

* * * * *